3,484,722
OPTICAL MODULATOR
Alfred S. Barker, Jr., Chatham, and Hans W. Verleur, Westfield, N.J., assignors to Bell Telephone Laboratories, Incorporated, Murray Hill and Berkeley Heights, N.J., a corporation of New York
Filed Nov. 23, 1966, Ser. No. 596,565
Int. Cl. H03c 1/02
U.S. Cl. 332—4
4 Claims

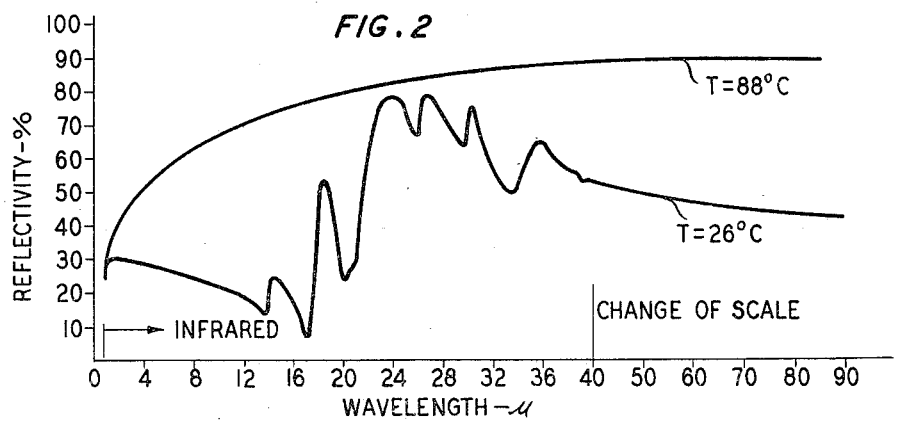
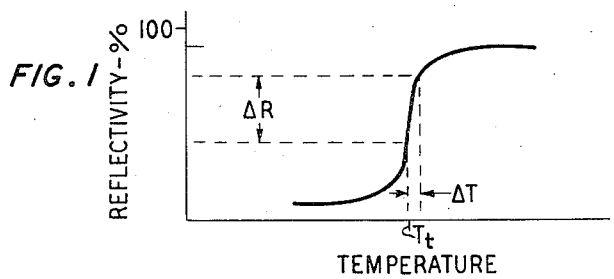
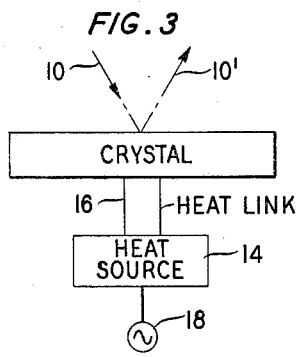
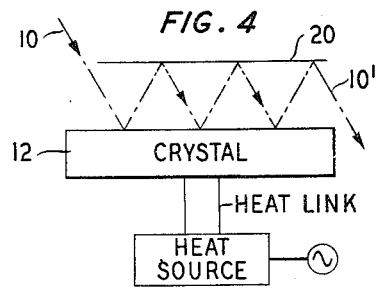
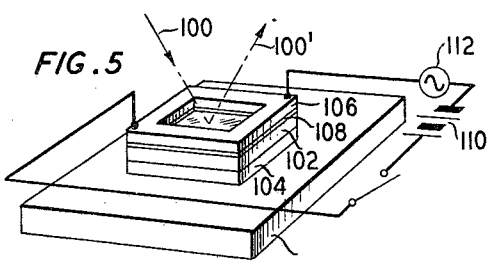
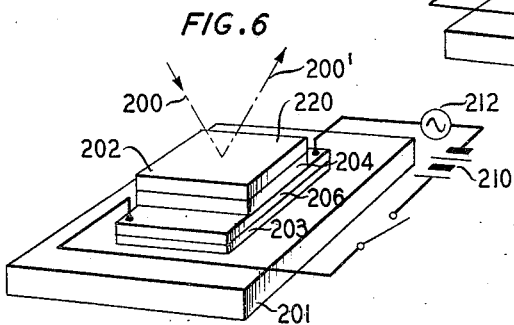
INVENTORS: A. S. BARKER, JR.
H. W. VERLEUR United States Patent Office 3,484,722
Patented Dec. 16, 1969

ABSTRACT OF THE DISCLOSURE

An optical modulator comprises a thermoreflectance material (e.g., vanadium dioxide) positioned in the path of an incident optical beam to be modulated. The reflectivity of the material, which undergoes a metal-semiconductor phase transition at a particular transition temperature, abruptly changes at that temperature. The device is thermally biased to the transition temperature, and its reflectivity is thermally modulated in accordance with an information signal.

---

This invention relates to optical modulators utilizing variable reflectivity materials.

The advent of the laser has resulted in extensive effort directed toward the development of an optical communication system. In such a system a laser beam serves as a carrier which is optically modulated in accordance with information to be transmitted. Efficient optical modulation techniques are important to the successful operation of such communications systems, and should preferably provide a high index of modulation, require small amounts of modulating energy and absorb little optical energy.

In one priorly known optical modulator employing variable reflectivity materials, namely, ferroelectric semiconducting crystals, a rectifying surface barrier is established in the crystal face where the optical beam to be modulated is made incident. The incident optical beam is chosen to have photon energies larger than the forbidden energy gap characteristic of the crystal. By varying the electric field in the space charge layer associated with such surface barrier, it has been found that the reflectivity of the crystal also changes. This effect has been termed electroreflectance. For modulation, a voltage is established across the surface barrier, and this voltage is varied in accordance with modulating information thereby to vary accordingly the amplitude of the reflected optical beam. An optical modulator of this type is disclosed in the copending application of P. J. Boddy and A. F. Frova, Ser. No. 536,033 filed on Mar. 21, 1966 and assigned to applicants' assignee.

It has been found that in crystals characterized by a metal-semiconductor phase transition the reflectivity of the crystal is temperature sensitive. That is, there is some transition temperature below which the crystal is a semiconductor and above which it is metallic. At this transition temperature the reflectivity of the crystal increases abruptly. This effect will be hereinafter termed thermoreflectance. It is also feasible, however, that the metal-semiconductor phase transition may be induced by applying pressure to the crystal.

While prior attempts have been made to utliize reflectivity changes for the modulation of optical waves, such attempts have not involved the use of thermoreflectance crystals as the reflecting medium. But for the optical modulator of Boddy et al., the maximum edgree of modulation which has been achieved wtih practical operating characteristics typically has been less than one percent. By way of contrast the present invention provides modulation of about thirty percent with practical operating conditions. At certain incident wavelengths, for instance, near 10μ, modulation of about one hundred percent is attainable.

In one embodiment of the invention a thermoreflectance crystal of vanadium dioxide is positioned in the path of an incident optical beam to be modulated. The temperature of the crystal is raised to an operating temperature near its transition temperature (68° C.) by the application thereto of heat. The crystal may be directly heated by establishing across the crystal a bias voltage which produces a heating current in the crystal. Modulating information is impressed on the bias voltage. As a consequence the temperature, and the reflectivity, of the crystal varies in accordance with the modulating information thereby amplitude modulating the reflected optical beam.

The invention has distinct advantages of simplicity, being a two-terminal device and small in size. Furthermore, the invention is readily fabricated in thin film form whereas in the device of Boddy et al., for example, it is difficult to do so because of the complex structure of the ferroelectric semiconducting crystals used. In addition the optical modulator is a broadband device, exhibiting significant increases in reflectivity for incident beam wavelengths from one to at least ninety microns.

The above and other objects of the invention, together with its various features and advantages, can be easily understood from the following more detailed description taken in conjunction with the accompany drawings, in which:

FIG. 1 is a graph of reflectivity versus temperature of a thermoreflectance crystal;

FIG. 2 is a graph of reflectivity of a thermoreflectance crystal versus wavelength of incident optical beam;

FIG. 3 shows schematically one embodiment of the invention;

FIG. 4 shows a multiple reflection arrangement of an invention for increasing the index of modulation;

FIG. 5 is a perspective drawing of one embodiment of the invention; and

FIG. 6 is a perspective drawing of a second embodiment of the invention.

Turning now to FIG. 1, there is shown a graph of reflectivity versus temperature of a thermoreflectance crystal, preferably vanadium dioxide, for an incident optical beam at a fixed wavelength. Thereon is indicated a transition temperature $T_t$ (68° C. for vanadium dioxide) at which the reflectivity of the crystal increases abruptly. Below $T_t$, where the reflectivity is about 20 percent, the crystal is a semiconductor having a monoclinic structure. Above $T_t$, where the reflectivity is nearly ninety percent, the crystal is a metal having a rutile structure. Although not shown in FIG. 1, the reflectivity curve exhibits a slight hysteresis in the vicinity of the transition temperature.

It has been found that the reflectivity of thermoreflectance crystals is also a function of the wavelength of the incident optical beam, as shown in FIG. 2 for vanadium dioxide. Below the transition temperature, as indicated by curve I for a crystal temperature of 26° C., the reflectivity varies in the manner shown for wavelengths from one to ninety microns. Above the transition temperature, as indicated by curve II for a crystal temperature of 88° C., the reflectivity increases rapidly at about one micron and then levels off, approaching nearly ninety percent at ninety microns.

Other thermoreflectance crystals have similar characteristics; namely, vanadium monoxide and vanadium sesquioxide which have transition temperatures of −148° C. and −95° C., respectively. Such crystals would accordingly require refrigeration for use in the manner described.

As shown in FIG. 3, for amplitude modulation an optical beam 10 to be modulated is made incident upon a thermoreflectance crystal 12 which is heated to an operating temperature near its transition temperature $T_t$ by heat source 14 through heat link 16. Modulating information of source 18 is made to vary the temperature of the crystal in the interval $\Delta T$, as shown in FIG. 1. A corresponding change in reflectivity $\Delta R$ results in amplitude modulation of the reflected optical beam 10'. The modulation index is defined as the ratio of the change in reflectivity to the reflectivity at the operating temperature, or $\Delta R/R$.

For larger amounts of modulation with a given temperature swing $\Delta T$, it is feasible to subject the optical beam to multiple reflections. For example, if the beam is subjected to three reflections, for a reflectivity of 0.8 there still remains fifty-one percent of the original beam intensity, which in most instances should be more than adequate. Such multiple reflection can be easily effected as shown schematically in FIG. 4 by positioning mirror 20 opposite the reflecting face of the crystal 12.

An optical modulator in accordance with the invention is shown in FIG. 5 and comprises a heat sink 101 separated from a vanadium dioxide crystal 102 by an insulator 104. An insulator 108 separates a resistive heater 106 from the crystal 102. The insulators 104 and 108, being of low thermal conductance, establish a temperature gradient which causes heat to flow from heater 106 to heat sink 101. Both the insulator 108 and the heater 106 are window-shaped to allow the optical beam 100 to be made incident on the crystal 102. A battery 110 and a modulating source 112 are connected in series with ohmic contacts 114 and 116 on heater 106.

The battery 110 causes a heating current to flow in resistive heater 106 sufficient to maintain the temperature of the vanadium dioxide crystal 102 near its transition temperature (68° C.). The modulating source 112 varies in accordance with modulating information the heat supplied to crystal 102 thereby varying accordingly its temperature and hence its reflectivity. The reflected beam 100' is then amplitude modulated in accordance with the modulating information.

As an illustration, the heat sink 101 is maintained at ambient temperature (25° C.). The components 102 to 108 are made 0.1 cm. square, and in addition the crystal 102 is made 0.01 cm. thick. The insulator 104 is epoxy having a thermal conductance of 0.01 cal./sec.-deg., and the insulator 108 is a thin film of silicon dioxide.

To maintain the vanadium dioxide crystal 102 at an operating temperature near 68° C. the resistive heater 106 should supply about 1.5 watts of power. The reflectivity of the crystal 102 under these conditions will be about fifty percent. To modulate the incident beam 100 by twenty percent 0.12 watt of modulating power should be supplied by the modulating source 112. The additional power raises the temperature of the crystal 102 by about 3° C.=$\Delta T$, and consequently increases the reflectivity of the crystal 102 from fifty to sixty percent which corresponds to a modulation index of $\Delta R/R=10/50=20\%$.

The power of the incident beam 100 is preferably maintained below 0.5 watt in order that the beam itself not heat the crystal 102 and thereby decrease the index of modulation.

The same twenty percent modulation can be achieved by eliminating the heater 106 and passing a 1.5 watt signal (1 volt at 1.5 amperes) directly through the crystal 102.

The modulation rate, that is the time required to produce the change in temperature $\Delta T$, is dependent upon the dimensions of components. In thin film form, modulation rates in the order of microseconds are feasible.

The particular materials, dimensions and operating conditions discussed above are illustrative only and are not to be construed as a limitation on the scope of the invention.

A second embodiment of the invention is shown in FIG. 6. A thermoreflectance crystal 202 is positioned in the path of an incident optical beam 200 to be modulated. An insulator 204 separates the crystal 202 from a resistive heater 206 which is separated from a heat sink 201 by another insulator 203. A source of energy, such as the battery 210, produces a heating current in the resistive heater 206 to raise the temperature of the crystal to an operating temperature near its transition temperature. A modulating signal source 212 is connected in series with the battery 210 and the heater 206 in order to vary in accordance with modulating information the heat energy supplied to the crystal 202. The variations in heat energy (and hence temperature) produce corresponding changes in the reflectivity of the crystal 202 thereby amplitude modulating the reflected optical beam 200'.

Alternatively, as discussed previously, the crystal 202 may be directly heated by connecting the battery 210 and modulating signal source 212 in series with the crystal 202 itself, thereby eliminating the insulator 204 and the resistive heater 206.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:
1. An optical modulator comprising a thermoreflectance material for reflecting an optical beam,
said material characterized by a metal-semiconductor phase transition at a particular transition temperature and by the property that its optical reflectivity changes abruptly at said transition temperature, and
means for heating said material to said transition temperature and in accordance with modulating information to change the optical reflectivity of said material and thereby to modulate the amplitude of the optical beam reflected from said material.
2. The optical modulator of claim 1 wherein said heating means comprises
a resistive member forming a heater,
an insulative layer contiguous with said material and said heater and separating said material from said heater, and
means for applying an electrical signal to said heater to cause heat to flow through said insulative layer and into said material.
3. The optical modulator of claim 1 wherein said material is selected from the group consisting of vanadium monoxide, vanadium dioxide, and vanadium sesquioxide.
4. The optical modulator of claim 1 in combination with means for causing multiple reflections of the optical beam on said material.

No reference cited.

ALFRED L. BRODY, Primary Examiner

D. R. HOSTETTER, Assistant Examiner

U.S. Cl. X.R.

332—7.51, 31; 350—160